(12) United States Patent
    Gao

(10) Patent No.: US 10,970,501 B2
(45) Date of Patent: Apr. 6, 2021

(54) BARCODE SCANNING SYSTEM WITH IMAGE OR VIDEO OUTPUT(S)

(71) Applicant: Datalogic USA, Inc., Eugene, OR (US)

(72) Inventor: WenLiang Gao, Eugene, OR (US)

(73) Assignee: Datalogic USA, Inc., Eugene, OR (US)

( * ) Notice: Subject to any disclaimer, the term of this patent is extended or adjusted under 35 U.S.C. 154(b) by 14 days.

(21) Appl. No.: 16/370,390

(22) Filed: Mar. 29, 2019

(65) Prior Publication Data

US 2020/0311361 A1   Oct. 1, 2020

(51) Int. Cl.
   *G06K 7/10* (2006.01)
   *G06K 7/14* (2006.01)
   *H04N 7/18* (2006.01)

(52) U.S. Cl.
   CPC ....... *G06K 7/10722* (2013.01); *G06K 7/1413* (2013.01); *H04N 7/183* (2013.01)

(58) Field of Classification Search
   CPC ..... G06K 7/10722; G06K 7/14; G06K 7/1478
   USPC ..... 235/462.41, 462.01, 462.11, 462.24, 375
   See application file for complete search history.

(56) References Cited

U.S. PATENT DOCUMENTS

| 7,195,164 | B2 | 3/2007 | Patel |
| 7,946,484 | B2 | 5/2011 | Patel et al. |
| 2003/0222147 | A1 | 12/2003 | Havens et al. |
| 2007/0284448 | A1 | 12/2007 | Wang |
| 2008/0142599 | A1* | 6/2008 | Benillouche ........... G06Q 30/02 235/462.41 |
| 2009/0212113 | A1* | 8/2009 | Chiu ........................ G06K 7/14 235/462.41 |
| 2014/0166761 | A1* | 6/2014 | Todeschini ......... G06K 7/10881 235/472.01 |
| 2019/0073499 | A1 | 3/2019 | Hardin |

FOREIGN PATENT DOCUMENTS

EP   0873013 A2   10/1998

OTHER PUBLICATIONS

European Search Report corresponding to EP20165805.1, dated Jul. 20, 2020, 7 pages.

* cited by examiner

*Primary Examiner* — Edwyn Labaze
(74) *Attorney, Agent, or Firm* — Foley & Lardner LLP

(57) ABSTRACT

A code reader may include at least one imager configured to capture image data of a scene including a machine-readable indicia. A first circuit may be in electrical communication with the imager(s), and be configured to receive the image data from the imager. A second circuit may be in communication with the imager and the first circuit, and be configured to control operation of said imager, and to process the image data including the machine-readable indicia to decode and/or identify data represented by the machine-readable indicia. The decoded and/or identified data may be output to a computer. A third circuit may be in electrical communication with the first circuit, and be configured to process the image data to produce processed (e.g., sub-sampled and compressed) image data, and to output the processed image data to the computer.

20 Claims, 7 Drawing Sheets

BARCODE SCANNING SYSTEM WITH IMAGE OR VIDEO OUTPUT(S)

BACKGROUND

Barcode readers or code readers are used in a variety of venues and environments. The purpose of a code reader can vary greatly from venue to venue as well as within the venue. Operators of venues in which code scanners or readers are utilized often have needs for cameras to be used for the purposes other than reading machine-readable codes. Such needs include, but are not limited to, security, loss prevention, document verification, payment identification and verification, signature capture, customer identification, product identification, and so on. As understood in the art, image processing of images with machine-readable indicia to be read by code readers consumes a significant amount of processing resources to identify and process (e.g., frame, decode, compress, read, store) images of the machine-readable indicia. As a result, conventional code readers are unable to suitably capture, process, and transfer images, including still and video, for security and/or other purposes without negatively impacting processing capabilities and/or bandwidth for processing the images of the machine-readable indicia.

BRIEF SUMMARY

To overcome the problem of a code reader not having sufficient bandwidth both to process images of machine-readable indicia and to process the same or different images from additional image sensor(s), such as a color image sensor dedicated for security or other purposes, a code reader may be configured to process the image data of the machine-readable indicia independent of processing image data of a scene in which the machine-readable indicia may or may not be located. The code reader may have a number of different configurations to support the conventional functions (e.g., capturing, decoding, reading, storing) machine-readable indicia while simultaneously processing image data.

A first configuration of a code reader may include an additional circuit, such as a webcam micro-control unit, that processes image data captured by an imager, where the additional circuit is independent of a micro-control unit (MCU) of the code reader configured to process machine-readable indicia data and control the imager and illuminator of the code reader. A second embodiment may include a code reader that includes a second imager that is electronically synchronized or optically separated and configured to capture images of a scene in which the machine-readable indicia may be positioned. The second imager may be controlled to cause image data to be captured outside of a timeframe during which the short-pass (e.g., red) illumination signal produced by an active illuminator and not in an ON state when the code reader is illuminating the machine-readable indicia. Alternatively, if the second imager is not synchronized, a red optical filter that filters out the red illumination signal may be disposed at the code reader to reduce or eliminate the red illumination signal from being sensed by the second imager. Another embodiment may include multiple additional imagers along with a controller that operates as a multiplexer to process and/or route image data in a successive manner. Still yet, an embodiment of the code reader may include an image processor configured to filter the red illumination signal captured in the images.

One embodiment of a code reader may include one or more imagers configured to capture image data of a scene including a machine-readable indicia. A first circuit may be in electrical communication with the imager(s), and be configured to receive and multiplex the image data from the imager(s). A second circuit may be in communication with the imager(s) and the first circuit, and be configured to control operation of the imager(s), and to process the image data including the machine-readable indicia to decode and/or identify data represented by the machine-readable indicia. The decoded and/or identified data may be output to a computer. A third circuit may be in electrical communication with the first circuit, and be configured to process the image data to produce processed (e.g., subsampled and compressed) image data, and to output the processed image data to the computer.

One embodiment of a process for operating a code reader may include capturing image data of a scene including a machine-readable indicia. The image data including the machine-readable indicia to decode and/or identify data represented by the machine-readable indicia may be processed. The decoded and/or identified data may be output to a computer. The image data to produce processed (e.g., subsampled and compressed) image data may be processed. The processed image data may be output to the computer.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION OF THE DRAWINGS

Figure 1:
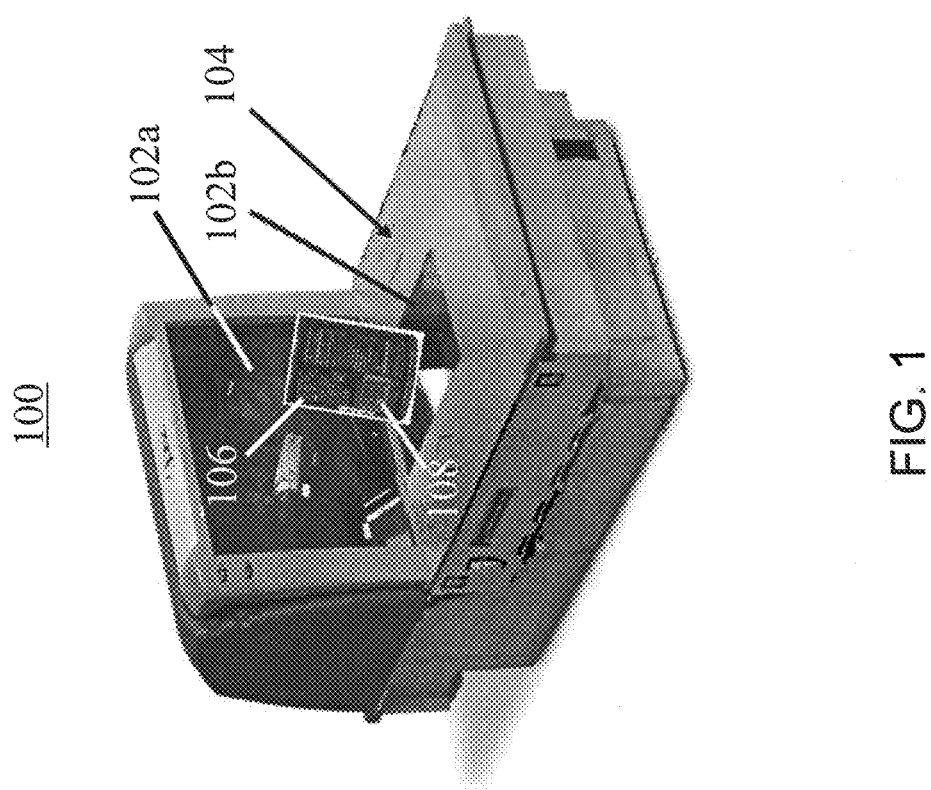
FIG. 1 is an illustration of an illustrative code reader configured with processing capabilities to perform reading of machine-readable indicia captured in images and to process the same or other images for other purposes with minimal or no reduction in bandwidth to process machine-readable indicia

With regard to FIG. 1, an illustration of an illustrative code reader 100 configured with processing capabilities to perform reading of machine-readable indicia captured in images and to process the same or other images for other purposes with minimal or no reduction in bandwidth to process machine-readable indicia is shown. The code reader 100 may be configured with one or more imagers (i.e., image sensor(s), such as CMOS sensors) (not shown) that may be positioned behind windows 102a and 102b configured to capture images (e.g., still images and/or video images) of a scene. In an embodiment, the code reader 100 includes a surface 104 on which objects, such as object 106 with a machine-readable indicia 108 printed thereon, may be placed or positioned for the machine-readable indicia to be in a target area of one or more imagers for imaging. The machine-readable indicia 108 is shown to be a barcode (e.g., UPC, ISBN, etc.), as understood in the art. The machine-readable indicia 108 may be any other type of machine-readable indicia, such as a quick reference (QR) code, graphic, watermark, alphanumeric text, feature, and/or any other indicia, that the code reader 100 may image, decode, and/or identify to determine the identity, price, and/or other information associated with the object 106. Data encoded into the machine-readable indicia 108 may be identified by the code reader 100 for product checkout at a store or other purpose (e.g., inventory control). It should be understood that the code reader 100 may have a wide range of styles, including being a handheld portable code reader, fixed-position code reader, or any other configuration of a code reader, as understood in the art. Although not shown, the code reader 100 may be in communication with a local or remote computing device, such as a personal computer or server, used for receiving, processing, and/or storing images, image data, machine-readable indicia data, and/or otherwise, as further described with regard to FIG. 2. It should be understood that the computer may be any computing device used to process data represented by the machine-readable indicia for any purpose.

In one embodiment, the code reader 100 may be configured to constantly scan a target area. In response to identifying the existence of the object 106 in the target area, the imager(s) may scan or image the machine-readable indicia 108 disposed on the object 106. The code reader 100 may thereafter decode and identify identifier(s) represented by the machine-readable indicia 108. The code reader 100 may have a variety of alternative configurations, such as being handheld, as understood in the art.

Figure 2:
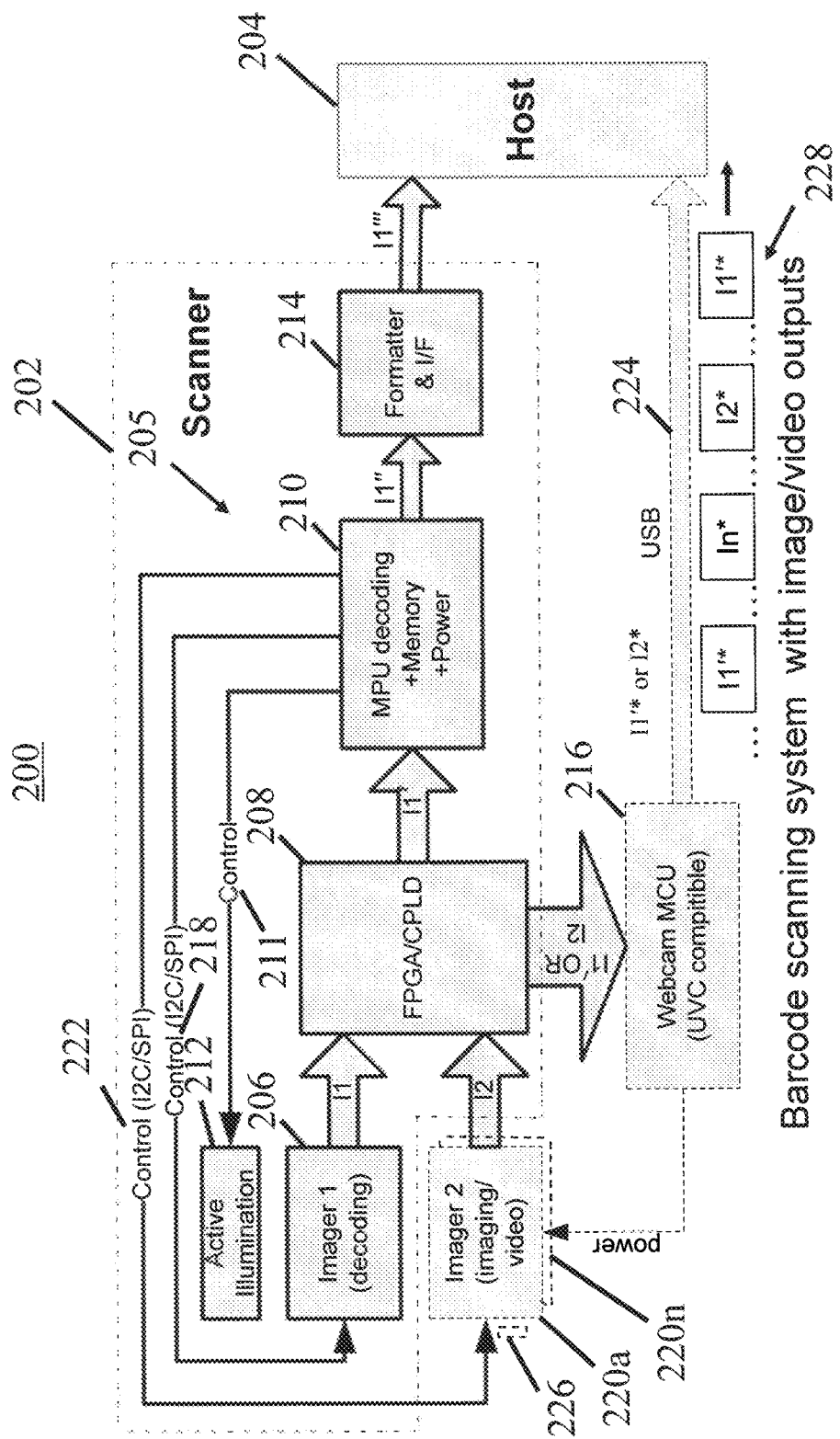
FIG. 2 is a block diagram of an illustrative code reader inclusive of an additional processor and optional imager configured to process images of a scene in which a machine-readable indicia is being read by the code reader.

With regard to FIG. 2, a block diagram of an illustrative code reader system 200 inclusive of an additional processor configured to process images of a scene in which a machine-readable indicia may be included is shown. The code reader system 200 may include a conventional or modified code reader or scanner 202 and a host computer 204, such as a personal computer, server, or otherwise. The code reader 202 may be a handheld, fixed, portable, or any other type of code reader, as understood in the art. The code reader 202 may include conventional code reader components 205, where the code reader components 205 may include an imager 206 that captures image data I1 of a scene from which machine-readable indicia may be decoded. The imager 206 is typically a monochromatic CMOS image sensor. A first circuit 208, in this case a field-programmable gate array (FPGA)/complex programmable logic device (CPLD), may be configured to manage timing, perform level translation, and pre-process the image data I1 to produce pre-processed image data I1'.

A second circuit 210, in this case a master processing unit (MPU), may include memory, power, and control circuitry to control operation of an active illuminator 212, such as a red laser or other illumination source, to illuminate a machine-readable indicia being imaged or scanned. The second circuit 210 may be configured to process the pre-processed image data I1' to decode and read data represented by the machine-readable indicia to generate processed image data I1" that may be output to a formatter and interface circuit 214 configured to format and output data I1"' to the host computer 204. The host computer 204 may use the output data I1"' to perform a transaction involving an associated object, count inventory, and/or otherwise, as understood in the art.

The code reader system 200 may have a number of different configurations, including, but not limited to: (i) an added third circuit 216, such as a webcam micro-control unit (MCU) to process images captured by the imager 206, (ii) an added imager 220a in addition to the third circuit 216, and (iii) multiple added imagers 220a-220n (collectively 220). Each of the different configurations may be supported by configuring and controlling the code reader components 205 along with any added components. The added component(s) may be used to enhance processing resources such that both conventional processing of machine-readable indicia and capturing and processing images may be performed with minimal or no negative impact on processing the machine-readable indicia by the code reader components 205.

In operation, the MPU 210 may communicate control signals 218 via a data bus, such as an I2C/SPI data bus, as understood in the art, to control operation of the first imager 206. It should be understood that alternative data buses and communications protocols may be utilized. The MPU 210 may further be configured to communicate control signals 211 to the active illuminator 212, which may be coordinated with control signals 218 used to control the first imager 206, as provided with regard to FIG. 3.

Added Circuit for Processing Images

In a first embodiment, to support capturing images and/or video data without impacting processing of the machine-readable indicia, a third circuit 216, such as a webcam micro-control unit (MCU), may be in electrical communication with the first circuit 208 via data bus 224. The third circuit 216 may be configured to subsample and perform image compression using standard image compression protocols for image data. By offloading the preprocessed image data I1' to the third circuit 216, the MPU 210 is able to perform conventional processing of machine-readable indicia without the added overhead of processing the image data (e.g., converting the image data to an mpeg and/or jpeg standard image). Other image standards may be utilized, such as H264. The third circuit 216 may be any webcam controller configured to output image and/or video data with USB video class (UVC) drive support over a data bus 224. For example, the webcam controller may be any of a Sonix Technology Co. Ltd SN9C270, Vimicro VC0353, or Realtek RTS5822 webcam. Webcam MCUs are generally cost effective as the devices are able to process image data and communicate via a USB or other standard data bus. In an embodiment, a physical USB port can be shared with other functions, such as a service port by an analog switch, so that no additional physical port is needed. It should be understood that any other controller or circuit may be utilized that performs the same or similar functions as a webcam MCU.

As depicted, the third circuit 216 is outside of the conventional code reader components 205 such that the third circuit 216 may be disposed on a separate printed circuit board (PCB) and physically positioned with or outside of the code reader 202 or on the same PCB as the conventional code reader components 205. In an embodiment, the third circuit 216 may be positioned within or at the host computer 204. Still yet, the functionality of the third circuit 216 may be integrated into another circuit other than the MPU 210. The third circuit 216 may be in electrical communication with the host computer 204 via the data bus 224, which may be a USB data bus or any other communications protocol, either wired or wireless.

In operation, upon receiving a command from the host computer 204 or by configuration of the first circuit 208, the first circuit 208 may switch or route the preprocessed image data I1' to be communicated to the third circuit 216 in addition to communicating the preprocessed image data I1' to the second circuit 210. The third circuit 216 may be configured to receive the image data I1', process the image data I1' by compressing and formatting the image data I1' to produce image data I1'* in a data format, such as jpeg or mpeg, for communication over the data bus 224 to the host computer 204. In an embodiment, a timestamp or frame number embedded in the image data I1'* and/or I1''' may be included to identify the relationship with an image that was used for decoding a corresponding machine-readable indicia (i.e., an image I1 used to produce I1'* and I1'''). The timestamp or frame number may be embedded by the first circuit 208, but any of the circuits or imagers may be configured to include a timestamp or frame number in the image data. By offloading the image data I1' to the third circuit 216, the second circuit 210 may be able to continue processing the image data I1' as conventionally performed, thereby enabling the support of both functions of (i) conventional reading machine-readable indicia and (ii) capturing images of scenes captured by the imager 206.

Added Circuit for Processing Images and Additional Imager

In a second embodiment, a second imager 220a may be integrated with the code reader components 205 and utilized to capture images. The second imager 220a may be any type of imager, and may be configured to capture still and/or video images of the scene and output image data I2. The second imager 220a may be powered by the third circuit 216, and be oriented to capture images having the same or similar image frame as the first imager 206. In an embodiment, the first imager 206 may be a CMOS monochrome imager configured to output monochrome image data and the second imager 220a may be a CMOS color (RGB) imager configured to output color image data. Alternatively, both the first and second imagers 206 and 220a may be configured to output color image data. Other image data formats may be generated and output, as well. In an embodiment, the second imager 220a may be a high-resolution imager (e.g., 16 mega-pixels), while the first imager 206 may be a lower resolution imager (e.g., 2 mega-pixels).

Typical machine-readable imagers, such as the first imager 206, are configured as global shutter (GS) CMOS monochrome imagers. For some applications, color images are desirable. If the second imager 220a is configured as an electronic rolling shutter (ERS) or global shutter without system synchronization, an optical filter 226 that filters out the illumination signals from the active illuminator 212 that are typically at 660 nm, 720 nm, or 850 nm. The filter 226 may be physically attached to the code reader 202, housing of the second imager 220a, or otherwise positioned to filter the illumination signal output by the active illuminator 212, as further described herein.

If the second imager 220a is configured with system synchronization, the exposure of the second imager 220a should be synchronized to be mutually exclusive from the illumination signal of the active illuminator 212. That is, the control signals 218 and 222 are to be synchronized such that the active illuminator 212 operates at different times than the second imager 220a is operating to capture an image, and as further shown with regard to FIG. 3.

Figure 3:
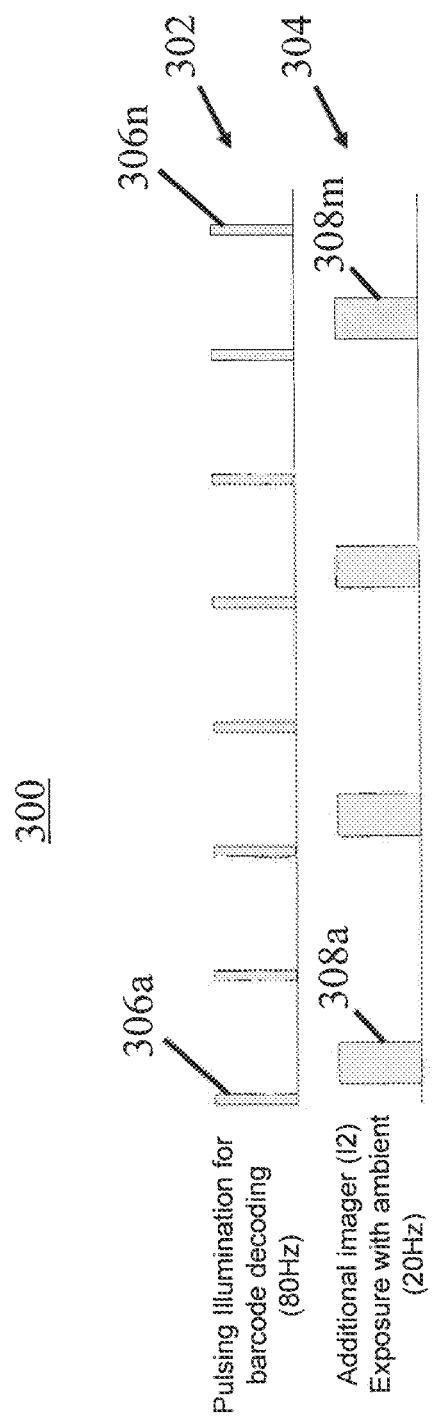
FIG. 3 is a timing diagram of illustrative illumination control signal and control signals used respectively for (i) illuminating and reading a machine-readable indicia using a first imager and (ii) capturing and processing images of a scene in which the machine-readable indicia may be positioned using a second imager.

With regard to FIG. 3, a timing diagram 300 of an illustrative illumination control signal 302 and control signal 304 used respectively for (i) illuminating and reading a machine-readable indicia using a first imager and (ii) capturing and processing images of a scene in which the machine-readable indicia may be positioned using a second imager is shown. If utilized with FIG. 2, the illumination control signal 302 may be generated in response to control signal 211 causing the active illuminator 206 to periodically illuminate a red illumination signal. The illumination control signal 302 may be composed of multiple illumination pulses 306a-306n (collectively 306) that illuminate a machine-readable indicia. The illumination pulses 306 may be output at 80 Hz or any other frequency. The control signal 304 is used to cause the second imager 220 (FIG. 2) to shutter or capture images during a time period of control pulses 308a-308m (collectively 308). If utilized with FIG. 2, the control signal 304 is the control signal 222. As shown, the control pulses 308 may be generated at 40 Hz or any other frequency, and are in an ON state when illumination pulses 306 are in an OFF state so that the second imager 220 avoids sensing the illumination signal (e.g., red illumination signal) that is being output by the active illuminator 212 (FIG. 2).

Multiple Additional Imagers

In a third embodiment, and with further regard to FIG. 2, the code reader system 200 may be configured with multiple additional imagers 220-220n (collectively 220) that are used to capture images of respective scenes. The additional imagers 220 may include the second imager 220a plus one or more other imagers 220b-220n that are in electrical communication with the reader 202, and in particular, in communication with the first circuit 208 and MPU 210 to enable the MPU 210 to control operation of the additional imager(s) 220 and enable the first circuit 208 to receive image data produced by the additional imagers 220b-220n in the same or similar manner as described with regard to the second imager 220a. The image data may include still and/or video image data.

In order to process the image data captured by the additional imager(s) 220b-220n, the first circuit 208 may be configured to operate as a multiplexer such that the image data captured by the first imager 206, second imager 220a, and other imager(s) 220b-220n may be routed via the third circuit 216 for processing thereby, as previously described with regard to the second imager 220a. As shown in FIG. 2, the first circuit 208 may receive, process, and output image data I1', I2', and/or In', to the third circuit 216 for compressing and formatting the image data into I1'*, I2*, and/or In* to generate a sequence of multiplexed signals 228. Although the image data I2 and In are not indicated as being processed by the first circuit 208, it is also contemplated that the first circuit 208 may also perform some processing of the image data I2 and In. The code reader system 200 may be configured to enable an operator to select which of the multiple imagers to use in capturing images. The imagers 220 may include a variety of different types and positioned and directed to capture various scenes, including overhead, fingerprint, countertop, and/or otherwise.

Figure 4:
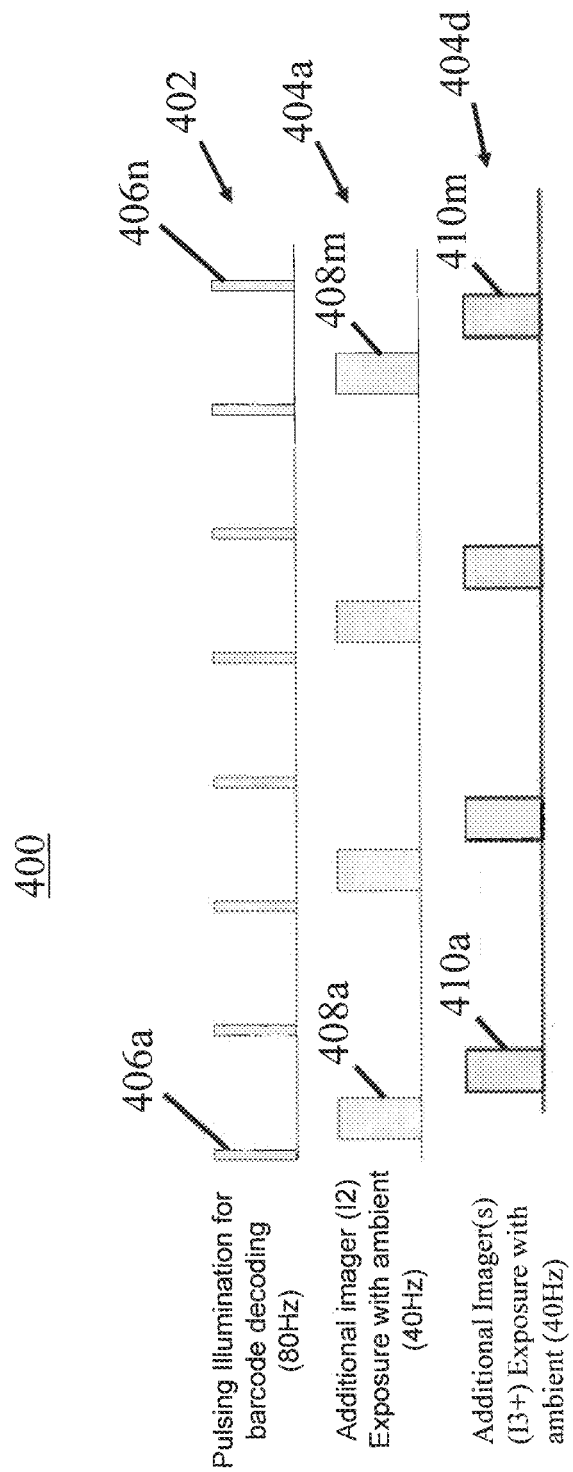
FIG. 4 is an alternative timing diagram used by a code reader inclusive of multiple imagers and a controller configured to function as a multiplexer to alternate processing and outputting images and/or video streams from the code reader to a host computer.

With regard to FIG. 4, an alternative timing diagram 400 used by a code reader inclusive of multiple imagers and a controller functioning as a multiplexer to alternate processing and outputting images and/or video streams from the code reader to a host computer is shown. An illumination control signal 402 and control signals 404a-404d (collectively 404) may be utilized to operate the code reader. The illumination control signal 402 may cause an active illuminator to transition between an OFF state and an ON state. The number of control signals 404 may be the same as the number of imagers of the code reader, and the control signals 404 may be synchronized relative to one another. In an embodiment, the control signals 404 may be synchronized so as to avoid causing an imager to be in an ON state when illumination pulses 406a-406n (collectively 406) of the illumination control signal 402 are in an ON state. The control signal 404a is shown to have control pulses 408a-408m (collectively 408) and control signal 404d is shown to have control pulses 410a-410m (collectively 410). As with FIG. 3, the illumination pulses 406 may be output at 80 Hz or any other frequency, and the control pulses 408 and 410 operate at 40 Hz. Although the control pulses 408 and 410 are shown to be in an ON state at mutually exclusive times, it should be understood that the timing of the control pulses 408 and 410 may be in an ON state at the same or overlapping times, and that the controller of the code reader may be configured to multiplex image data captured by the respective imagers irrespective of the ON state timing. To avoid capturing illumination produced by the active illuminator, the ON states of the control pulses 408 and 410 are to be in OFF states of the illumination control signal 402.

Figure 5A:
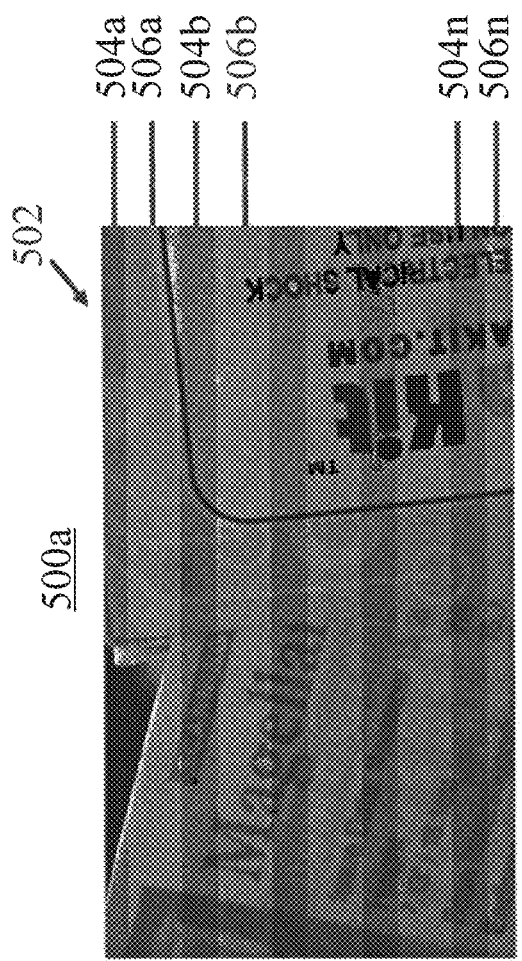
FIGS. 5A and 5B are illustrative images of a scene in which (i) undesirable signals from a barcode scanner active illumination are captured in the scene by an imager other than the imager for barcode decoding of a code reader and (ii) the undesirable illumination signals are not captured in the scene by the imager.
Figure 5B:
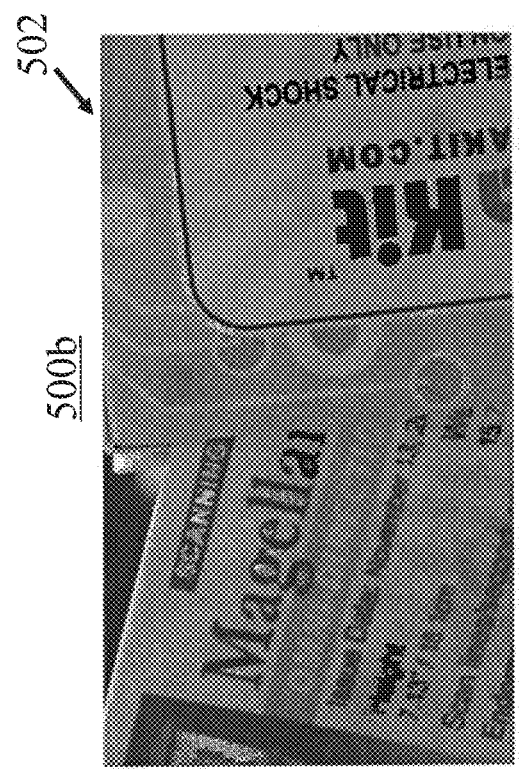

With regard to FIGS. 5A and 5B, illustrative images 500a and 500b of a scene 502 in which (i) undesirable red active illumination signals are captured in the scene by an imager of a code reader and (ii) the undesirable illumination signals are not captured in the scene by the imager are shown. The image 500a of the scene 502 is shown to have discoloration or stripes 504a-504n and 506a-506n therein as a result of an active illuminator cycling in respective ON and OFF states during an ON state of a shutter of a second imager capturing an image of the scene 502. As provided in FIG. 5B, the image 500b of the scene 502 does not include discoloration as a result of the shutter of the second imager being in an ON state when the active illuminator is in an OFF state such that the scene is illuminated by ambient light or another non-scanning illumination signal used to illuminate a scene being captured by the a second illuminator. In the event of using a filter to filter out the wavelengths(s) (e.g., red) of an illumination signals that is output by the active illuminator, then the image 500b is also representative of the scene 502 without capturing the illumination signal filtered by a short-pass filter.

Figure 6A:
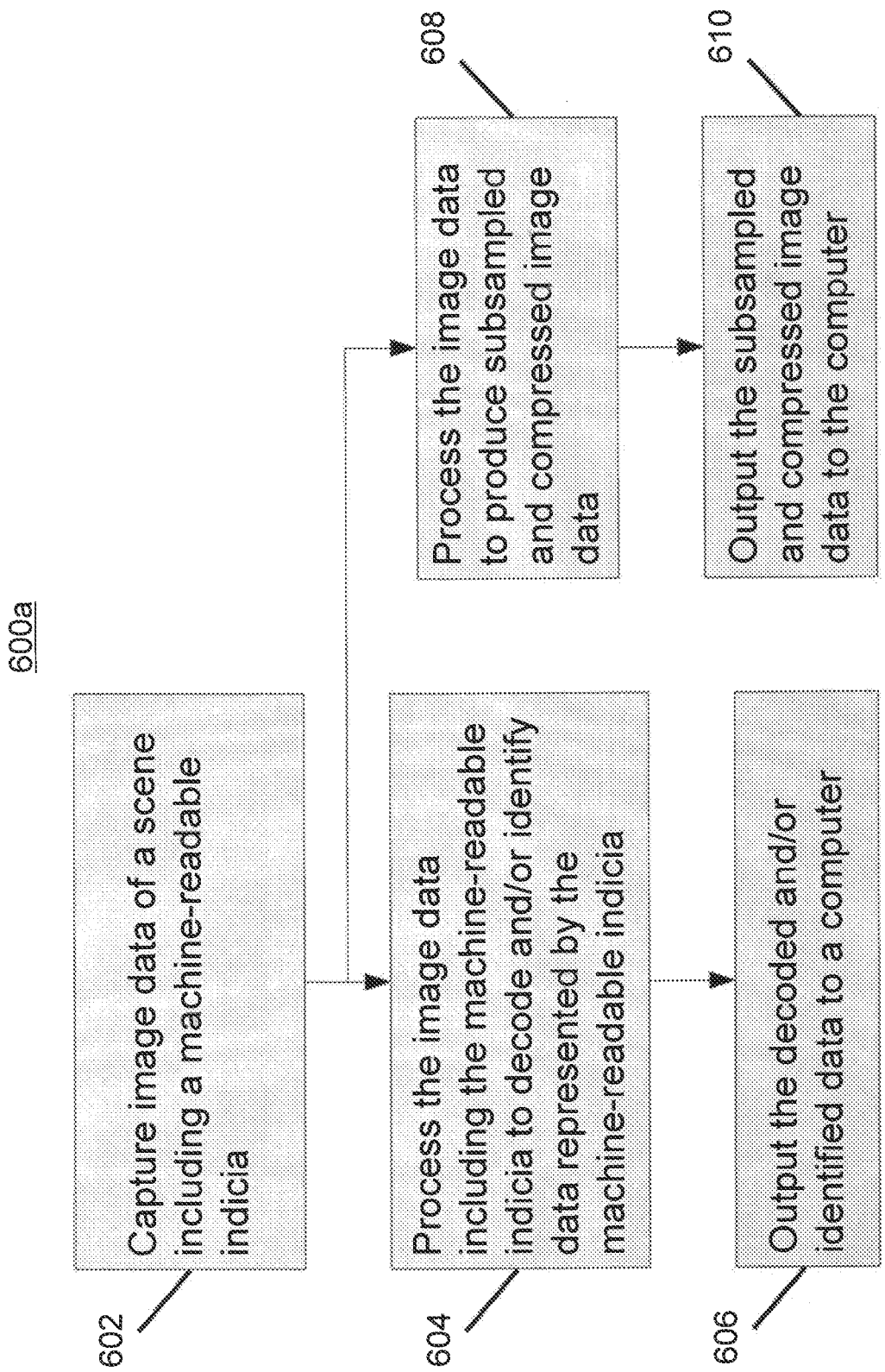
FIGS. 6A and 6B is a flow diagram of an illustrative process for processing and reading machine-readable image data and independently processing image data with or without an additional imager other than the imager for barcode reading.

With regard to FIG. 6A, a flow diagram of an illustrative process 600a utilizing a single imager for imaging, processing, and reading machine-readable image data and independently processing image data with or without a machine-readable indicia contained therein is shown. The process 600a for operating a code reader with a single imager may start at step 602, where image data of a scene including a machine-readable indicia may be captured. At step 604, the image data including the machine-readable indicia may be processed to decode and/or identify data represented by the machine-readable indicia (e.g., barcode, Digimarc barcode, QR code, etc.) by a device, such as an MPU. The decoded and/or identified data may be output to a computer at step 606. The image data may be processed at step 608 to produce processed image data, such as subsampled and compressed image data. At step 610, the processed image data may be communicated to the computer. The subsampling and compressing of the image data may be performed by a device, such as a webcam controller. As shown, the processing at steps 604 and 608 may be performed simultaneously as each may be performed by different devices.

Capturing the image data may include capturing video data, which may be in an MPEG video data format. In an embodiment, capturing the image data may include capturing a still image data, which may be in the form of a JPEG data format. The image data may be processed (i) to decode and/or identify data represented by the machine-readable indicia and (ii) to produce subsampled and compressed image data in parallel with one another. In an embodiment, a timestamp and/or image frame associated with the image data may be generated to enable the computer to associate the decoded machine-readable indicia and subsampled and compressed image data.

Second image data of the scene including the machine-readable indicia may be captured. A first control signal having a first periodic pulse that causes an illumination source to output an illumination signal at the scene to illuminate the machine-readable indicia for imaging may be generated, and a second control signal having a second periodic pulse that is offset from the first periodic signal may be generated such that the illumination signal is in an OFF state when capturing an image of the scene.

In an embodiment, wavelengths between 600 nm and 900 nm may be filtered out prior to capturing an image of the scene. In an embodiment, the first and second image data may be multiplexed. The image data may be processed to produce subsampled and compressed image data by a webcam micro-control unit.

Figure 6B:
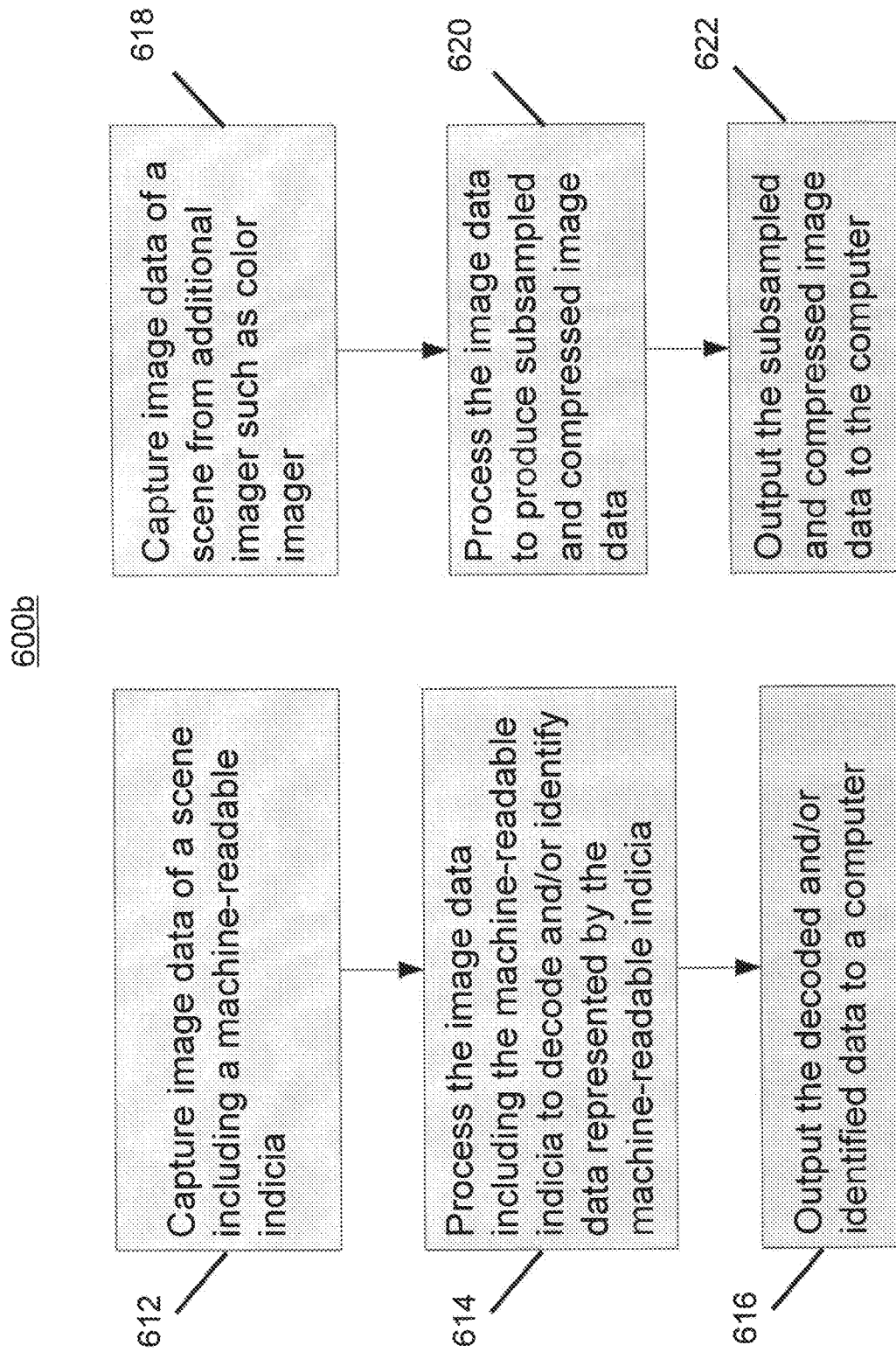

With regard to FIG. 6B, a flow diagram of an illustrative process 600b utilizing a multiple imagers for imaging, processing, and reading machine-readable image data and independently processing image data with or without a machine-readable indicia contained therein is shown. The process 600b for operating a code reader with multiple imagers may start at step 612, where image data of a scene including a machine-readable indicia may be captured by a first imager. At step 614, the image data including the machine-readable indicia may be processed to decode and/or identify data represented by the machine-readable indicia (e.g., barcode, digimarc barcode, QR code, etc.) by a device, such as an MPU. The decoded and/or identified data may be output to a computer at step 616. At step 618, simultaneous to imaging the machine-readable indicia, a scene may be imaged and image data may be produced by a second imager, such as a color imager. The image data may be processed at step 620 to produce subsampled and compressed image data, and at step 622, the subsampled and compressed image data may be communicated to the computer. The subsampling and compressing of the image data may be performed by a device, such as a webcam controller. As shown, the imaging and processing at steps 612 and 614 and imaging and processing at steps 618 and 620 may be performed simultaneously as each may be performed by different imaging and processing devices, as previously described.

The foregoing method descriptions and the process flow diagrams are provided merely as illustrative examples and are not intended to require or imply that the steps of the various embodiments must be performed in the order presented. As will be appreciated by one of skill in the art, the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations may be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed here may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to and/or in communication with another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description here.

When implemented in software, the functions may be stored as one or more instructions or code on a non-transitory computer-readable or processor-readable storage medium. The steps of a method or algorithm disclosed here may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used here, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The previous description is of a preferred embodiment for implementing the invention, and the scope of the invention should not necessarily be limited by this description. The scope of the present invention is instead defined by the following claims.

What is claimed is:

1. A code reader, comprising:
   at least one imager configured to capture image data of a scene including a machine-readable indicia;
   a first circuit in electrical communication with said at least one imager, and configured to receive the image data from said at least one imager;
   a second circuit in communication with said at least one imager and said first circuit, and configured to:
      control operation of said at least one imager;
      process the image data including the machine-readable indicia to decode and/or identify data represented by the machine-readable indicia; and
   output the decoded machine-readable indicia data to a computer;
   a third circuit in electrical communication with said first circuit, and configured to:
      process image data to produce processed image data; and
      output the processed image data to the computer; and
   a second imager in electrical communication with said first circuit, and configured to capture second image data of the scene including the machine-readable indicia, said first circuit communicating the second image data to said third circuit.

2. The code reader according to claim 1, wherein the image data is video data, and wherein said third circuit is configured to generate MPEG video data.

3. The code reader according to claim 1, wherein said third circuit is a WebCam micro-control unit (MCU).

4. The code reader according to claim 1, wherein said second and said third electronic circuits are configured to process the image data in parallel with one another.

5. The code reader according to claim 1, wherein a timestamp and/or image frame associated with the image data is communicated to the computer by both of said second and said third electronic circuits to enable the computer to associate the decoded machine-readable indicia and processed image data.

6. The code reader according to claim 1, further comprising an illumination source in electrical communication with said second circuit, said second circuit generating a first control signal having a first periodic pulse that causes said illumination source to output an illumination signal at the scene to illuminate the machine-readable indicia for imaging by said at least one imager, and wherein said second circuit is further configured to generate a second control signal having a second periodic pulse that is offset from the first periodic signal such that the illumination signal is in an OFF state when said second imager is controlled by the second control signal to capture an image of the scene.

7. The code reader according to claim 1, further comprising an optical filter configured to filter out wavelengths between 600 nm and 900 nm.

8. The code reader according to claim 1, wherein said first circuit is further configured to multiplex the first and second image data.

9. The code reader according to claim 1, wherein the processed image data is subsampled and compressed image data.

10. The code reader of claim 1, wherein the first imager is a monochrome imager and the second imager is a color imager.

11. The code reader of claim 1, wherein the first circuit is a field-programmable gate array, the second circuit is a master processing unit, and the third circuit is a micro-control unit.

12. A method for operating a code reader, comprising:
 capturing, with a first imager, image data of a scene including a machine-readable indicia;
 capturing, with a second imager, second image data of the scene including the machine-readable indicia;
 processing the image data including the machine-readable indicia to decode and/or identify data represented by the machine-readable indicia;
 outputting the decoded and/or identified data to a computer;
 processing the image data to produce processed image data; and
 outputting the processed image data to the computer.

13. The method according to claim 12, wherein capturing the image data includes capturing video data, and further comprising generating MPEG video data.

14. The method according to claim 12, wherein capturing the image data includes capturing a still image data, and further comprising generating JPEG data.

15. The method according to claim 12, further comprising processing the image data (i) to decode and/or identify data represented by the machine-readable indicia and (ii) to produce processed image data in parallel with one another.

16. The method according to claim 12, further comprising generating a timestamp and/or image frame associated with the image data to enable the computer to associate the decoded machine-readable indicia and processed image data.

17. The method according to claim 12, further comprising:
 generating a first control signal having a first periodic pulse that causes an illumination source to output an illumination signal at the scene to illuminate the machine-readable indicia for imaging; and
 generating a second control signal having a second periodic pulse that is offset from the first periodic signal such that the illumination signal is in an OFF state when capturing an image of the scene.

18. The method according to claim 12, further comprising filtering out wavelengths between 600 nm and 900 nm.

19. The method according to claim 12, further comprising multiplexing the first and second image data.

20. The method according to claim 12, wherein the processed image data is subsampled and compressed image data.

* * * * *